United States Patent
McDonald (10) Patent No.: US 7,218,025 B1
(45) Date of Patent: May 15, 2007

(54) ROTATIONAL MAGNETIC ELECTRICAL GENERATING DEVICE

(75) Inventor: Donnie Pat McDonald, Ada, OK (US)

(73) Assignee: Contiempo Energy, LLC, Stratford, OK (US)

( * ) Notice: Subject to any disclaimer, the term of this patent is extended or adjusted under 35 U.S.C. 154(b) by 102 days.

(21) Appl. No.: 11/133,703

(22) Filed: May 20, 2005

(51) Int. Cl.
*H02K 21/00* (2006.01)
*H02K 7/09* (2006.01)

(52) U.S. Cl. .................. 310/90.5; 310/152; 310/156.01

(58) Field of Classification Search ........ 310/152–153, 310/156.01, 156.48, 156.49, 156.53
See application file for complete search history.

(56) References Cited

U.S. PATENT DOCUMENTS

| | | | | |
|---|---|---|---|---|
| 3,888,553 A | * | 6/1975 | Wehde | 310/90.5 |
| 3,983,430 A | | 9/1976 | Howard | |
| 4,668,885 A | * | 5/1987 | Scheller | 310/90.5 |
| 4,710,239 A | | 12/1987 | Lee | |
| 5,043,615 A | * | 8/1991 | Oshima | 310/90.5 |
| 5,220,233 A | | 6/1993 | Birch | |
| 5,245,270 A | * | 9/1993 | Akiyama | 322/4 |
| 5,250,861 A | | 10/1993 | Cummins | |
| 5,495,221 A | * | 2/1996 | Post | 335/299 |
| 5,506,459 A | * | 4/1996 | Ritts | 310/90.5 |
| 5,625,241 A | * | 4/1997 | Ewing et al. | 310/156.37 |
| 5,847,480 A | * | 12/1998 | Post | 310/90.5 |
| 5,894,183 A | | 4/1999 | Borchert | |
| 6,153,958 A | * | 11/2000 | Hull et al. | 310/90.5 |
| 6,191,561 B1 | | 2/2001 | Bartel | |
| 6,570,286 B1 | * | 5/2003 | Gabrys | 310/90.5 |
| 6,603,233 B2 | | 8/2003 | Strohm | |
| 6,771,000 B2 | | 8/2004 | Kim | |
| 2004/0113502 A1 | * | 6/2004 | Li et al. | 310/90.5 |
| 2004/0174079 A1 | * | 9/2004 | Izraelev | 310/90.5 |

* cited by examiner

*Primary Examiner*—Burton Mullins
(74) *Attorney, Agent, or Firm*—Randal D. Homburg (57) ABSTRACT

A rotational magnetic electrical generating device produces an alternating electrical current generated by a central rotational magnetic cylinder with an inner cavity having an central fixed coil operated by a DC current providing a driving rotational force upon a plurality of embedded neodymium magnets within the inner cavity of the central rotational magnetic cylinder, the central rotational magnetic cylinder having an upper outer margin with an upper magnetic ring and a lower outer margin having a lower magnetic ring, the two magnetic rings suspending the central rotational magnetic cylinder between two fixed magnetic fields supported by a frame member, the central rotational magnetic cylinder further having an outer perimeter surface embedded with a plurality of neodymium alloy magnets equally sized and spaced apart, a lower surface embedded with a plurality of neodymium alloy magnets equally sized and spaced apart, and an upper surface embedded with a plurality of neodymium alloy magnets equally sized and spaced apart. A plurality of alternate wound electrical stators are suspended above the upper surface, below the lower surface and around the outer perimeter surface of the central rotational magnetic cylinder, supported by the frame member while insulated from the frame member, each electrical stator connected to external leads to transmit alternating current generated by the spinning central rotational magnetic cylinder, the entire device enclosed within a vacuum.

4 Claims, 9 Drawing Sheets

ROTATIONAL MAGNETIC ELECTRICAL GENERATING DEVICE

CROSS REFERENCE TO RELATED APPLICATIONS

None

I. BACKGROUND OF THE INVENTION

1. Field of Invention

A rotational magnetic electrical generating device produces an alternating electrical current generated by a central rotational magnetic cylinder with an inner cavity having an central fixed coil operated by a DC current providing a driving rotational force upon a plurality of embedded neodymium magnets within the inner cavity of the central rotational magnetic cylinder, the central rotational magnetic cylinder having an upper outer margin with an upper magnetic ring and a lower outer margin having a lower magnetic ring, the two magnetic rings suspending the central rotational magnetic cylinder between two fixed magnetic fields supported by a frame member, the central rotational magnetic cylinder further having an outer perimeter surface embedded with a plurality of neodymium alloy magnets equally sized and spaced apart, a lower surface embedded with a plurality of neodymium alloy magnets equally sized and spaced apart, and an upper surface embedded with a plurality of neodymium alloy magnets equally sized and spaced apart. A plurality of alternate wound electrical stators are suspended above the upper surface, below the lower surface and around the outer perimeter surface of the central rotational magnetic cylinder, supported by the frame member while insulated from the frame member, each electrical stator connected to external leads to transmit alternating current generated by the spinning central rotational magnetic cylinder, the entire device enclosed within a vacuum.

2. Description of Prior Art

The following United States patents were discovered and are disclosed within this application for utility patent. All relate to electrical generating devices or devices including electrical coil devices.

A power generating system is disclosed in U.S. Pat. No. 6,771,000 to Kim which comprises a compressor for compressing intake air and supplied fuel, a combustor for burning the medium gas, a turbine rotated by the burned medium gases, an electrical rotary machine having a stator with a primary winding and stator magnetic pole, a rotor having a field magnet facing the stator magnetic pole and a shaft, and a displacement mechanism on the rotor, a power converter electrically connected to the rotary machine, a controller for controlling the power converter, with the field magnet further including a first field magnet of sequentially alternating polarities, a second field magnet rotatable with the first field magnet with the two filed magnets rotating in opposing direction.

A variable output rotary generator is disclosed in U.S. Pat. No. 6,191,561 to Bartel, which is an apparatus for generation of electrical power downhole within a earth borehole caused by varying the alignment of permanent magnets rotating within an armature having electrical conductive windings. U.S. Pat. No. 5,894,183 to Borchert is an improved permanent magnet generator rotor made of a laminate plate material which retains embedded rectangular magnets on all six sides, also disclosing a method of fabricating the improved rotor.

A superconducting electrical power generating system is disclosed in U.S. Pat. No. 5,250,861 to Cummins. This system provides a plurality of superconducting individual solenoid sources alternately arranged in a radial array, each adjacent to a region. Disposed between the regions and the sources is a hollow cylinder made of a magnetically porous material. A rotary drive mechanism is coupled to the cylinder and produces a rotation. Retained at diametrically opposed positions on the outer surface of the cylinder are a plurality of arcuate sheets of superconductor material. Disposed within the cylinder is an array of alternating electrical conductor bundles, each positioned in one of the regions and radially aligned with one of the sources. This device requires a coolant for maintaining the temperature of the solenoid sources and superconductor sheets. The sheets rotate between the sources and the bundles.

An electrical generator is disclosed in U.S. Pat. No. 3,983,430 to Howard comprising at least one stationary permanent magnet and at least one stationary core of a non-permanent magnetic material provided with induction field coil windings and disposed in alignment with the magnet and poles facing one another, a magnetic flux field suppressor moveably mounted between the magnet and core, the suppressor being a flat disk with alternating sections of magnetic and non-magnetic material, and a means of rotating the disk so that the disk causes an alternating induction of electrical current and voltage caused by the sequentially interrupted flux filed.

Neodymium alloy permanent magnets have been known in the art and disclosed in several patents, including U.S. Pat. No. 4,710,239 to Lee, which is a permanent magnet made of an alloy consisting of iron, neodymium and/or praseodymium and boron. Two U.S. Pat. No. 5,220,233 to Birch and U.S. Pat. No. 6,603,233 to Strohm have discussed use of the neodymium alloy magnets for use in construction of dynamo-electric machines or electrical generators.

II. SUMMARY OF THE INVENTION

Electrical generating devices using permanent magnets are known in the prior art, as demonstrated by the several patents disclosed and many others of similar design and function. Over time, permanent magnets have become more sophisticated and have even been patented as new inventions, as indicated in the neodymium magnet. These magnet have been incorporated into new generating devices. However, these devices also have mechanical components that create friction causing the generation of heat, and also wear at the components where the friction occurs. The current device eliminates contact between moving parts during the generation of electromagnetic AC current of the prior art by placing a magnetic field between a rotating magnetic cylinder in a vacuum environment enclosed structure, the rotating magnetic cylinder being the only moving part within the entire device and not in contact with any other component in the device.

A central rotational magnetic cylinder is suspended within a friction free magnetic field in a fixed support frame, and is compelled to rotate by electromagnetic cyclic direct current generated by a central fixed coil suspended within a cylindrical inner cavity of the central rotational magnetic cylinder, the central rotational magnetic cylinder having spaced sets of embedded magnets on an upper surface, lower surface, inner cavity surface and outer surface. As the central rotational magnetic cylinder rotates, a plurality of electrically wound stator coils are electrically induced by the passing of the embedded magnets, generating an alternating electrical current. The entire device is encased within a structure having a vacuum to further reduce heat and enhance the efficiency of electrical and magnetic transfer and conductivity, with the stator coils transmitting the generated alternating electrical current outside the enclosed structure.

The primary objective of the invention is to provide an electrical generating device with no contact between moving parts and operating within a vacuum. A secondary objective is to provide the device with a singular moving component which has no contact with any other component, the moving component suspended by magnetic fields.

III. DESCRIPTION OF THE DRAWINGS

The following drawings are submitted with this utility patent application.

FIG. 9 is a side cross sectional view of the upper stator coil and the upper surface of the central rotational magnetic cylinder showing their proximal orientation, along section lines 9/9 of FIG. 1.

FIG. 10 is a side cross sectional view of the outer stator coil and the outer surface of the central rotational magnetic cylinder showing their proximal orientation, along section lines 10/10 of FIG. 1.

FIG. 11 is a side cross sectional view of the lower stator coil and the lower surface of the central rotational magnetic cylinder showing their proximal orientation.

FIG. 16 is a cross-sectional view of the device demonstrating the central rotational magnetic cylinder suspended between the magnetic flanges of the upper and lower retainer without the upper, lower and outer stator coils.

IV. DESCRIPTION OF THE PREFERRED EMBODIMENT

Figure 1:
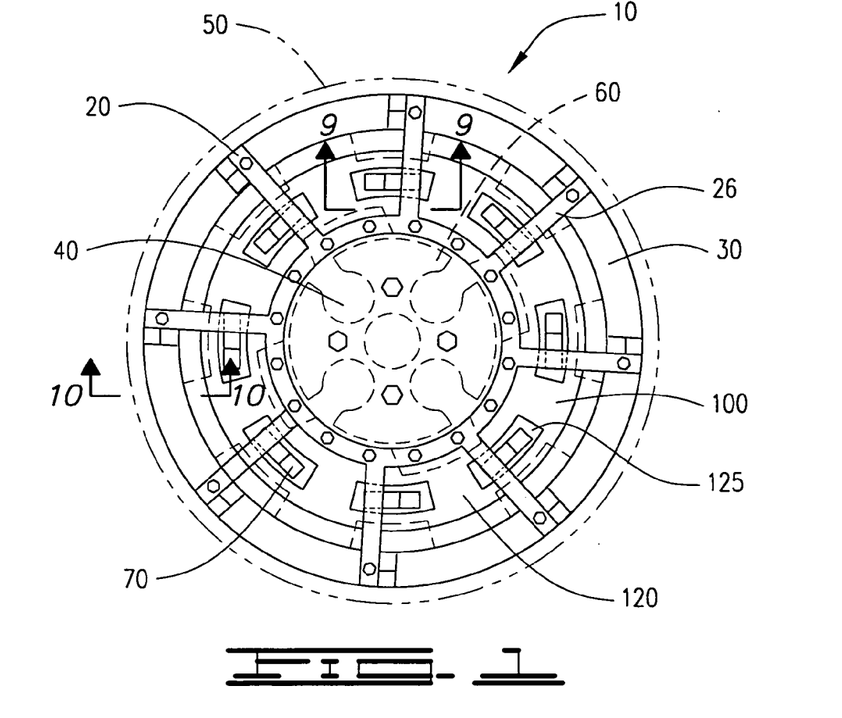
FIG. 1 is a top view of the device.
Figure 2:
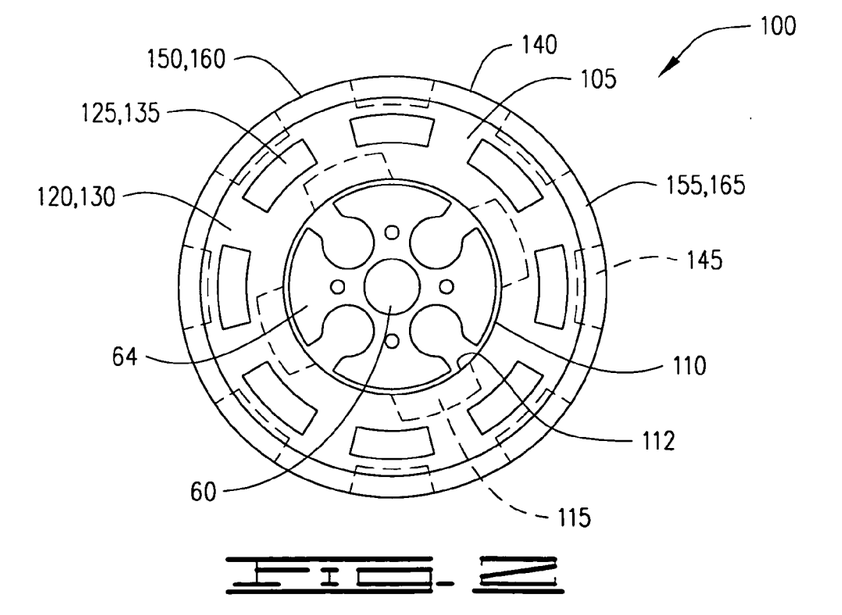
FIG. 2 is a top view or a bottom view of the central fixed coil within the central rotational magnetic cylinder.
Figure 3:
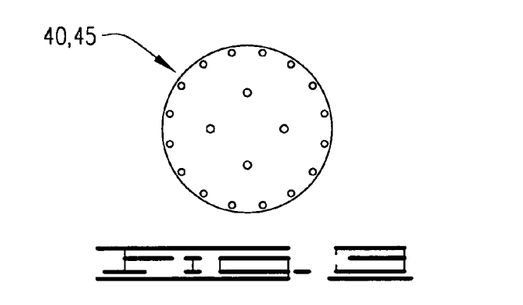
FIG. 3 is a top view of the upper and lower motor mount frame member.
Figure 4:
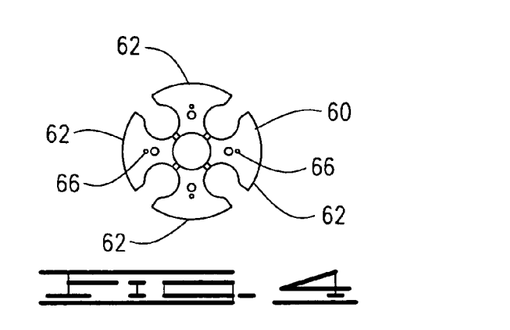
FIG. 4 is a top view of the central fixed coil.
Figure 5:
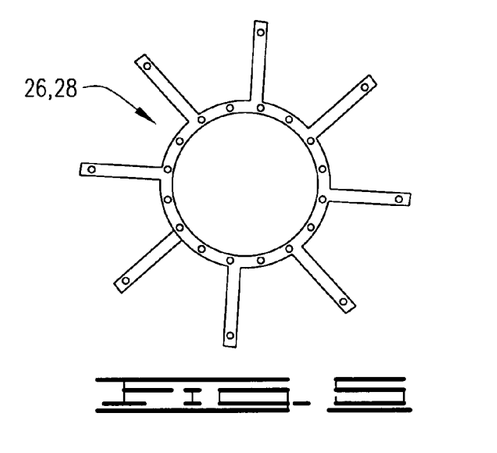
FIG. 5 is a top view of the upper support legs and a bottom view of the lower support legs.
Figure 6:
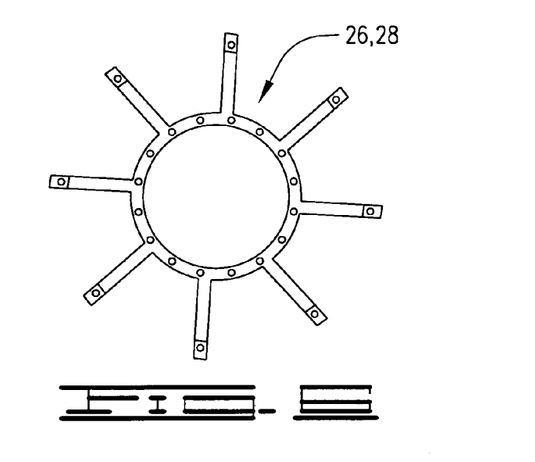
FIG. 6 is a bottom view of the upper support legs and an upper view of the lower support legs.
Figure 7:
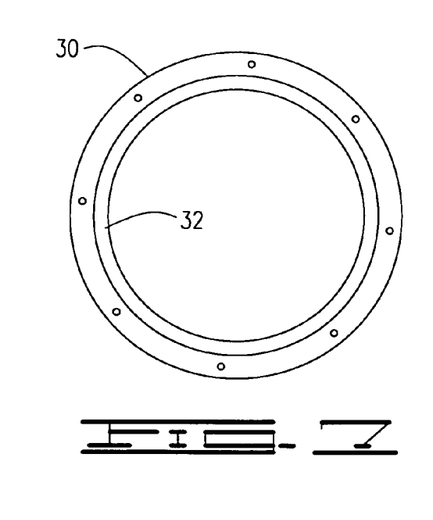
FIG. 7 is a lower view of the upper retainer ring.
Figure 8:
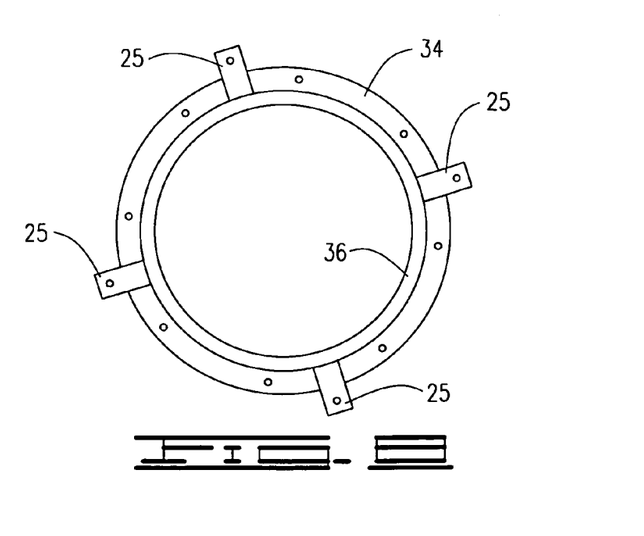
FIG. 8 is an upper view of the lower retainer ring.
Figure 12:
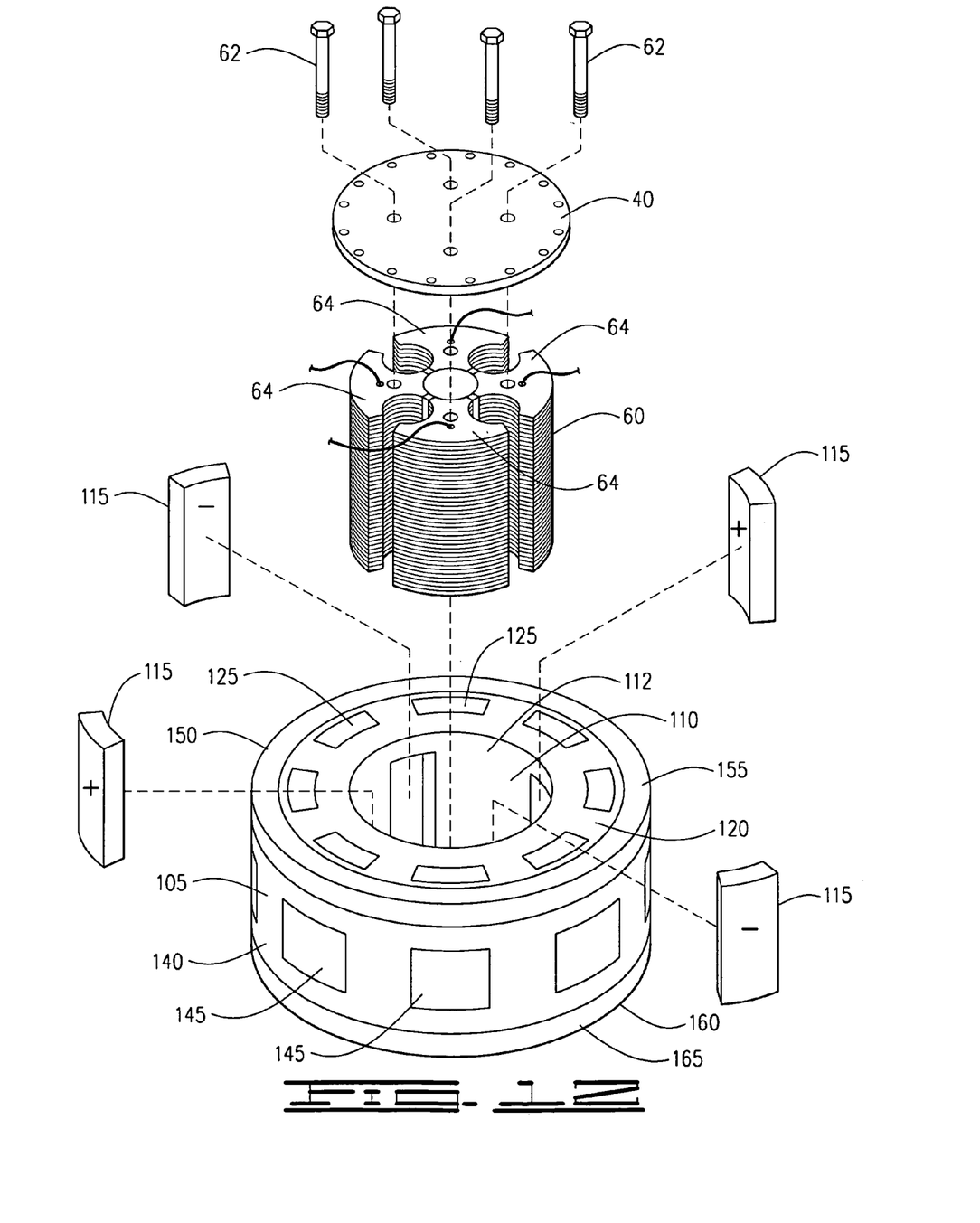
FIG. 12 is an expanded view of the central rotational magnetic cylinder, the central fixed coil and the upper motor mount frame member.
Figure 13:
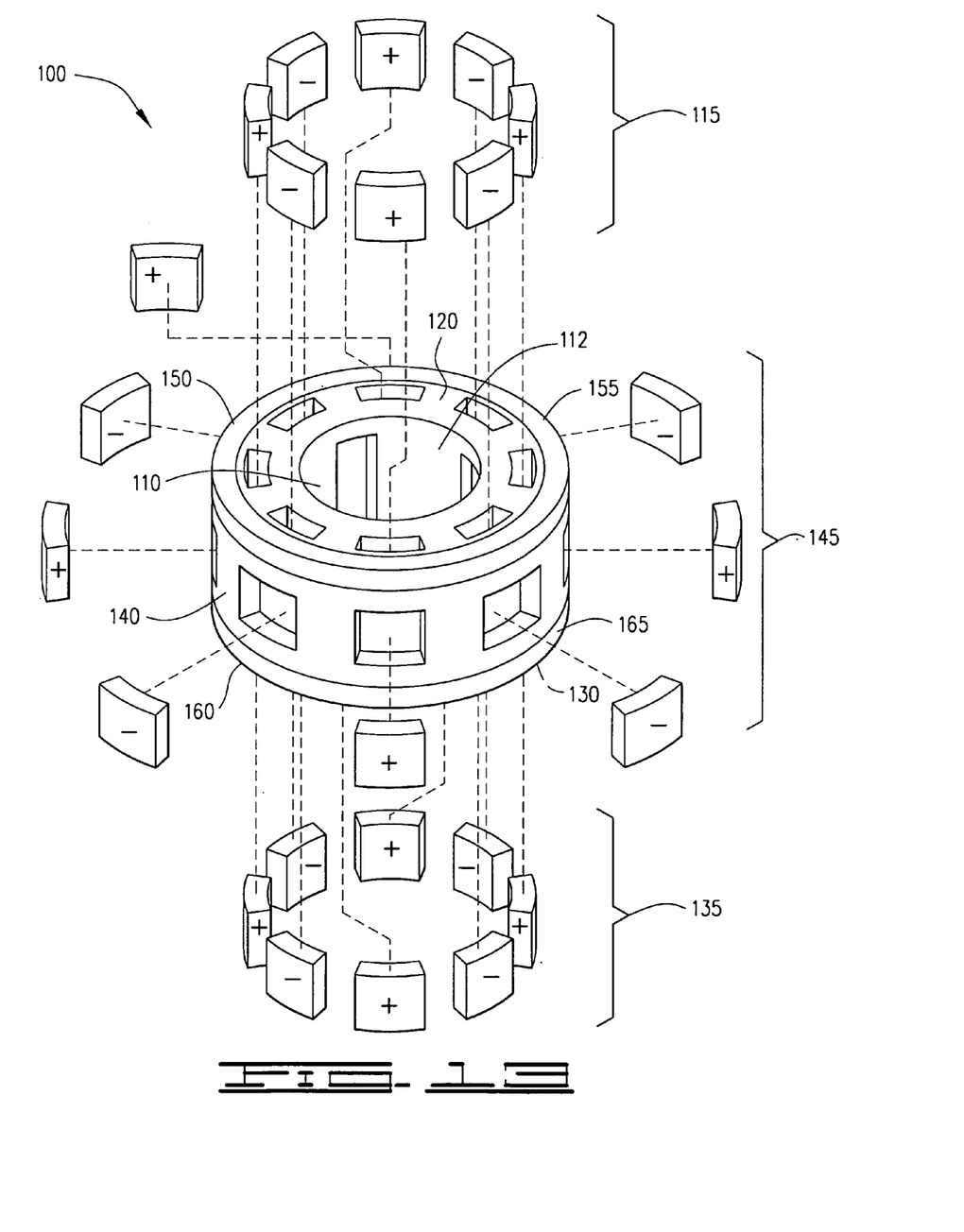
FIG. 13 is an expanded view of the central rotational magnetic cylinder and the upper, lower, and outer magnets and the upper and lower perimeter magnetic rings.
Figure 14:
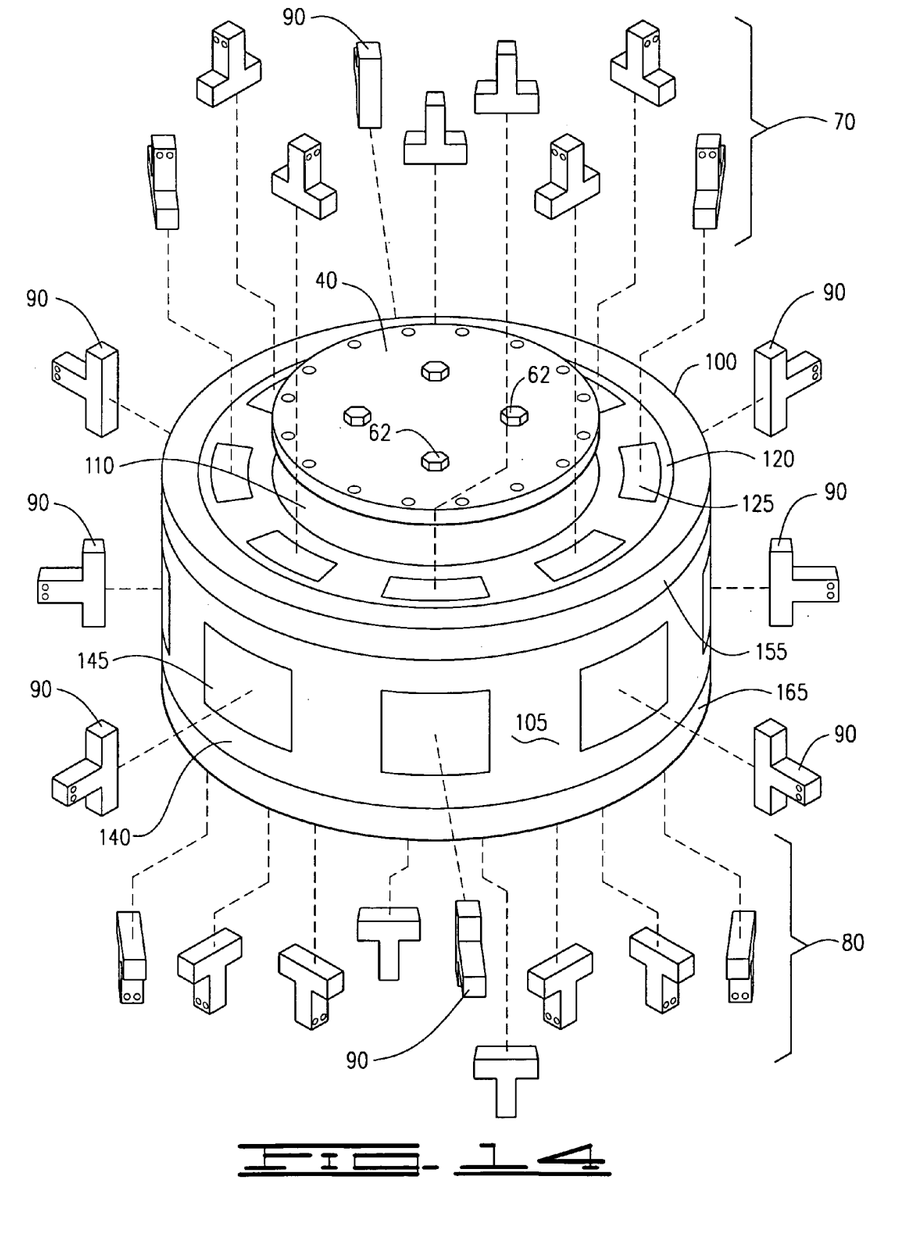
FIG. 14 is an upper perspective view of the central rotational magnetic cylinder and the upper, lower and outer stator coils.
Figure 15:
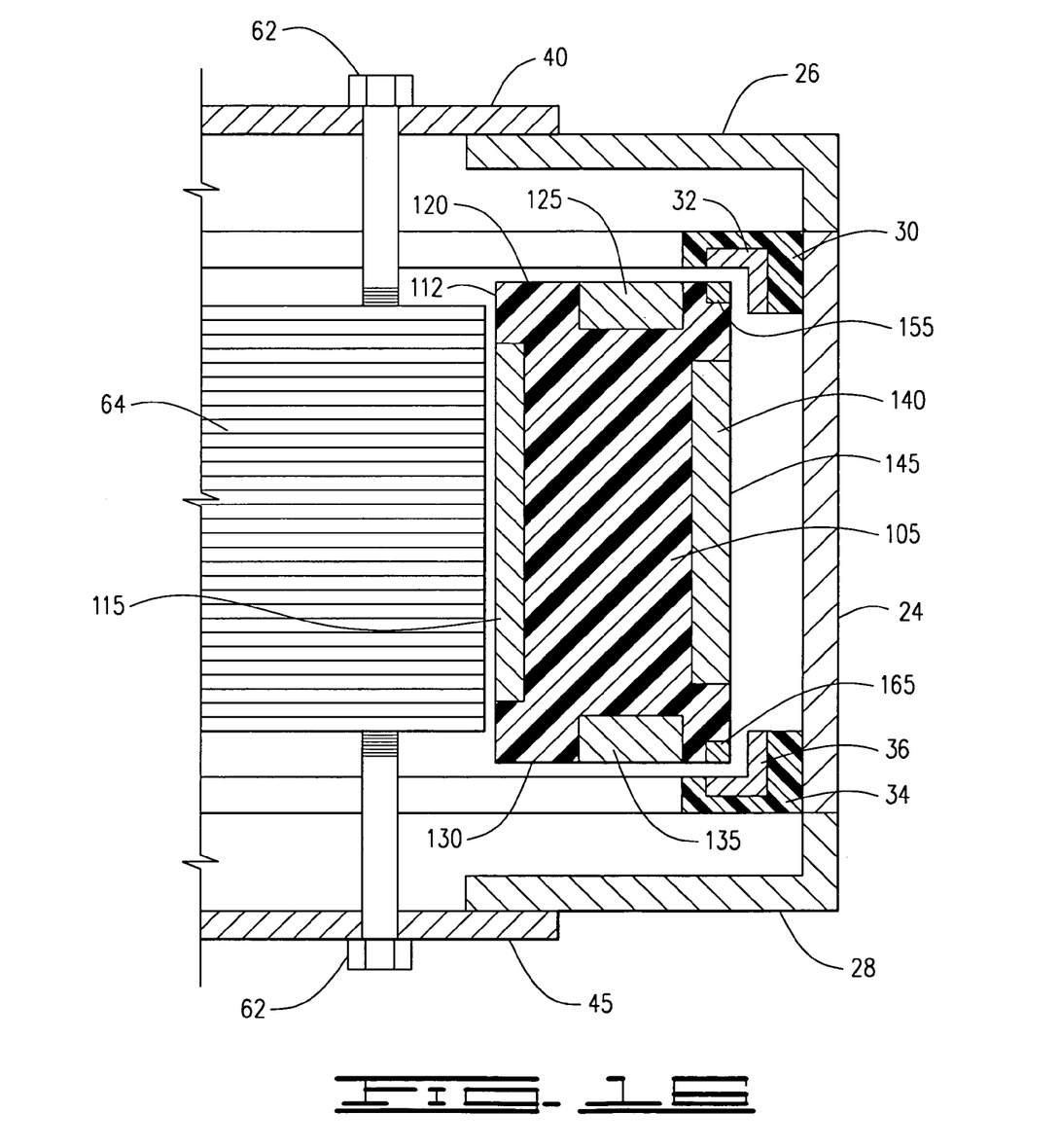
FIGS. 15A and 15B are an expanded view of the fixed support frame and the enclosure.
Figures 15A, 15B:
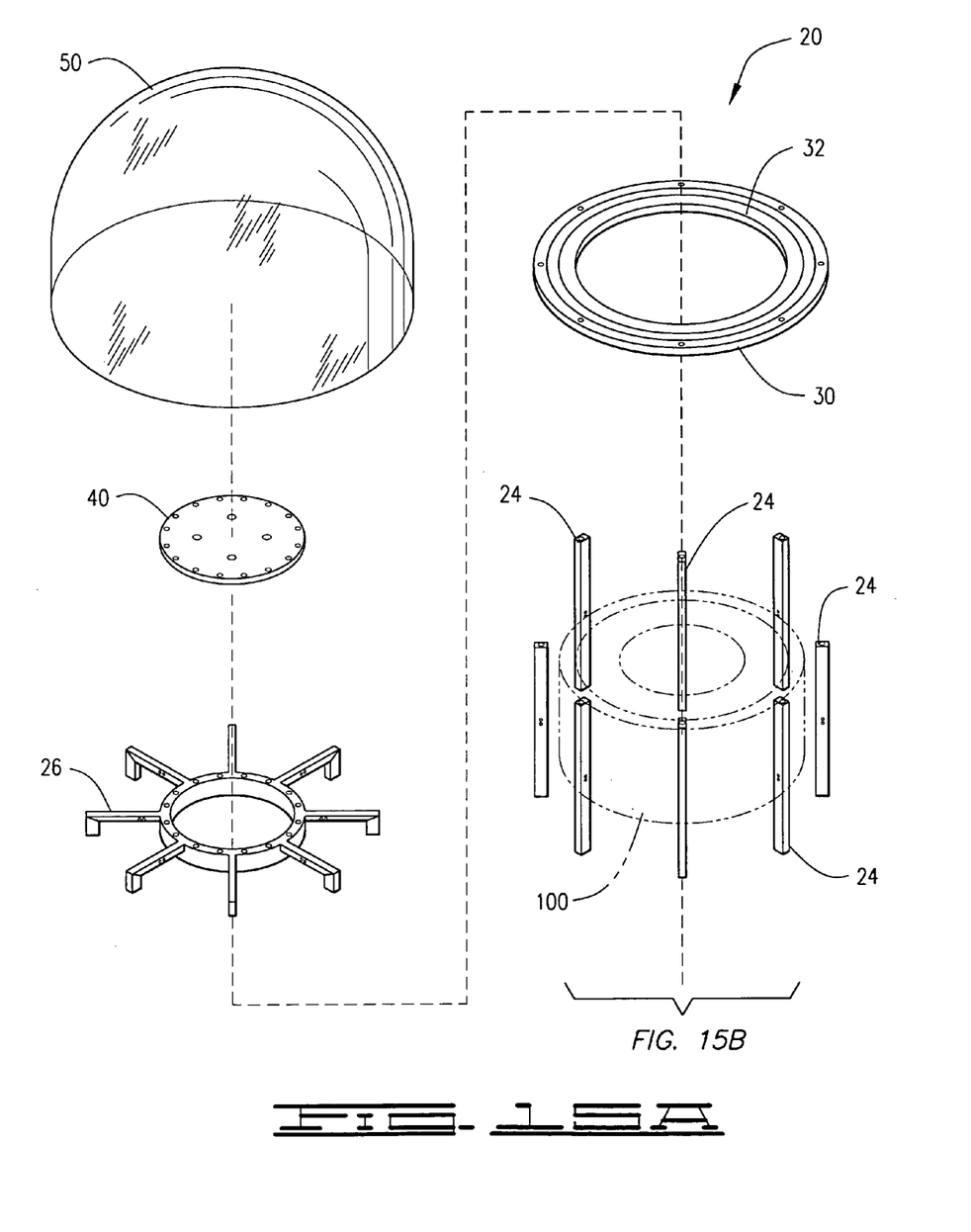

A rotary electro-magnetic generating device 10, shown in FIGS. 1–16 of the drawings, for the production and generation of alternating electrical current (AC) having but one single moving component without contact friction with any other components comprises a fixed support frame 20 within which is suspended a central rotational magnetic cylinder 100 between an upper and lower magnetic field, the central rotational magnetic cylinder 100, rotating between the frictionless, non-contact magnetic fields.

The central rotational magnetic cylinder 100, shown in FIGS. 1, 2, 9–14 and 16, comprises a supporting body 105 made of a non-conducting material and having an inner cylindrical cavity 110 defined therein, the inner cylindrical cavity 110 having an inner surface 115 having a set of evenly spaced alternate polarity embedded inner magnets 115, an upper surface 120 having a set of evenly spaced alternate polarity embedded upper magnets 125, a lower surface 130 having a set of evenly spaced alternate polarity embedded lower magnets 135, an outer surface 140 having a set of evenly spaced alternate polarity outer magnets 145, an upper perimeter magnetic ring 155 embedded at an upper margin 150 defined between the upper surface 120 and the outer surface 140 and a lower perimeter magnetic ring 165 embedded at a lower margin 160 defined between the lower surface 130 and the outer surface 140. The area between each inner magnet 115, upper magnet 125, lower magnet 135 and outer magnet 145 exposes the non-conductive supporting body 105, FIGS. 12, 14, 16. An even number of magnets is required of each plurality of magnets 115, 125, 135, 145 in order to provide that each magnet is polarly opposite each adjacent magnet. All the magnets 115, 125, 135, 145 embedded within the central rotational magnetic cylinder 100 are most preferably neodymium alloy permanent magnets.

The upper perimeter magnetic ring 155 has a polar charge and is urged downward by an upper retainer 30 held in fixed position to the fixed support frame 20, the upper retainer 30 having a like charged inner magnetic flange 32, while the lower perimeter magnetic ring 165 has a polar charge and is urged upward by a lower retainer 34 held in a fixed position to the fixed support frame 20, the lower retainer 34 having a like charged inner magnetic flange 36, thereby suspending the central rotational magnetic cylinder 100 without contact by force of magnetic fields produced between the upper and lower perimeter magnetic rings 155, 165 and the inner magnetic flanges 32, 36. See FIGS. 1 and 16.

The fixed support frame 20, FIGS. 5–8, 15A, 15B, comprises a central support ring 22, central support legs 24 holding the upper retainer 30 and lower retainer 34 in parallel alignment, upper support legs 26 which support a upper motor mount frame member 40, and lower support legs 28 which support a lower motor mount frame member 45. The entire fixed frame member 20 is surrounded by an enclosure 50 having an inner surface 55 supported by and attached to the central support ring 22 of the fixed support frame 20, the entire device contained within the enclosure 50, the enclosure 50 containing a vacuum atmosphere. There may also be provided a plurality of projecting gimbal support legs 25 projecting outward from the fixed support frame 20 in contact with the inner surface 55 of the enclosure 50 to preclude the fixed support frame 20 from vibrating against or coming into repeated contact with the enclosure 50 caused by rotational torque or gyroscopic forces produced by the operational device 10.

A central fixed coil 60 is suspended between the upper motor mount frame member 40 of the fixed support frame 20 and the lower motor mount frame member 45 of the fixed support frame 20 by elongated anchor bolts 62 positioning the central fixed coil 60 within the cylindrical inner cavity 110 of the cylindrical rotational magnetic cylinder 100, without contact with the cylindrical inner cavity 110, FIGS. 2–4, 12 and 16. The central fixed coil 60 is supplied with a DC current, the central fixed coil 60 having four outer field coils 64, spaced apart and wound in opposite and alternating directions, each outer field coil 64 alternately charged with positive and negative direct electrical current fed by DC current leads 66 attached to the central fixed coil 60 from outside the enclosure 50. Each outer field coil 64 is twice alternately provided the positive and negative charge during a cycle. During the cycle, the central fixed coil 60 compels the central rotational magnetic cylinder 100 to rotate by a rotational electro-magnetic induction field generated between the outer field coils 60 and the set of inner magnets 115 within the cylindrical inner cavity 110, such rotation being without contact with any other stationary member within the device 100.

The device 10 further provides a plurality of upper stator coils 70, a plurality of lower stator coils 80 and a plurality of outer stator coils 90, FIGS. 9–11 and 14. Each of the plurality of upper stator coils 70 include a stator ridge 72, an attaching end 74 attaching to the upper support legs 26 of the fixed frame member 20, and a lead attaching point 76, with each upper stator coil 70 insulated from the upper support legs 26. The plurality of upper stator coils 70 must be provided as an even number and are wound opposite from each adjacent upper stator coil. The upper stator coils 70 are attached in a circle above the upper surface 120 of the central rotational magnetic cylinder 100 with the stator ridge 72 of each upper stator coil 70 positioned above and proximal to the upper magnets 125 of the upper surface 120, FIG. 8. Each of the plurality of lower stator coils 80 include a stator ridge 82, an attaching end 84 attaching to the lower support legs 28 of the fixed frame member 20, and a lead attaching point 86, with each lower stator coil 80 insulated from the lower support legs 28. The plurality of lower stator coils 80 must be provided as an even number and are wound opposite from each adjacent lower stator coil. The lower stator coils 80 are attached in a circle below the lower surface 130 of the central rotational magnetic cylinder 100 with the stator ridge 82 of each lower stator coil 80 positioned below and proximal to the lower magnets 135 of the lower surface 130, FIG. 11. Each of the plurality of outer stator coils 90 include a stator ridge 92, an attaching end 94 attaching to the central support legs 24 of the fixed frame member 20, and a lead attaching point 96, with each outer stator coil 90 insulated from the central support legs 24. The plurality of outer stator coils 90 must be provided as an even number and are wound opposite from each adjacent outer stator coil. The outer stator coils 90 are attached in a circle around the outer surface 140 of the central rotational magnetic cylinder 100 with the stator ridge 92 of each intermediate stator coil positioned beside and proximal to the outer magnets 145 of the outer surface 140, FIG. 10.

As the central rotational magnetic cylinder 100 rotates, the embedded magnets 125, 135, 145 being alternately charged, induce each stator coil 70, 80, 90 with a magnetic charge, alternating positive and negative, creating a fluctuating electrical current for each stator coil 70, 80, 90. The number of stator coils 70, 80, 90 is equal to the number of embedded magnets 125, 135, 145 on each proximal surface 120, 130, 140, so that half of the stator coils in each set are positively charged, while the other half would be negatively charged at any given moment, except for the period in the cycle where the stator coils 70, 80, 90 are all aligned over the non-conductive material of the supporting body 105, which would provide a momentary neutral charge on the stator coils 70, 80, 90. The charge directed to each stator coil 70, 80, 90 is transmitted by a respective electrical lead 78, 88, 98 attached to the lead attaching point 76, 86, 96 of each stator coil 70, 80, 90, the electrical leads 78, 88, 98 penetrating the enclosure 50 to a source outside the enclosure 50, including a transformer, capacitor, other electrical component or directly to another machine requiring alternating current to operate, either in the vicinity of the device 10 or at a remote location.

The rotation and number of cycles per second is dictated by direct electrical current applied to the central fixed coil 60. The greater the cycles per second of the central rotational magnetic cylinder 100, the greater the alternating current output of the device 10. In addition, the amount of alternating electrical current is directly proportional to the strength of the embedded upper, lower and outer magnets 125, 135, 145 within the central rotational magnetic cylinder 100, which is in turn, directly proportional to the overall size of the device 100.

Permanent neodymium alloy magnets are preferable to a permanent ferrous magnet due to the enhance strength of the neodymium magnets. It is known in the art that the permanent neodymium alloy magnets have been calculated to yield approximately $1 \times 10^9$ lines of gauss/cm$^2$, while the permanent ferrous magnets are less than $1 \times 10^8$ lines of gauss/cm$^2$. In addition, the more preferred number of magnets in each plurality of upper magnets 125, plurality of lower magnets 135 and plurality of outer magnets 145, with the number of upper stator coils 70, lower stator coils 80 and outer stator coils 90 also being eight in number per each set, FIG. 13. The preferred number of inner magnets 115 would be four, FIG. 12. By having eight magnets in each set and eight proximal and respective stator coils in each set, the rotation or cycle of the central rotational magnetic cylinder would only need to be 450 RPMs in order to generate a 60 Hz frequency of generated AC current, which is the standard AC current frequency used in the United States. If two magnets and stator coils were used in each plurality, the RPMs would need to be at 3600 RPMs to generate a 60 hz AC current frequency, four magnets and stator coils in each plurality would require 1800 RPMs to generate the 60 Hz AC current frequency, and six magnets and stator coils would require 900 RPMs to generate the 60 Hz AC current frequency. The more magnets and stator coils per even numbered increment, the less RPMs would be required to generate the preferred AC current frequency, which reduces the amount of centripetal force of the device, reduce the amount of DC current required to rotate the central rotational magnetic cylinder, and the reduce the forces upon the fixed support structure.

While the invention has been particularly shown and described with reference to a preferred embodiment thereof, it will be understood by those skilled in the art that changes in form and detail may be made therein without departing from the spirit and scope of the invention.

What is claimed is:

1. A rotary electro-magnetic generating device for production and generation of AC electrical current having but one single moving component without contact friction with any other components comprises:

a fixed support frame having a central support ring, central support legs attached between an upper retainer having an inner magnetic flange having a polar charge and a lower retainer having an inner magnetic flange having a polar charge, said upper retainer ring and lower retainer ring held in parallel alignment by said central support legs, upper support legs above the upper retainer suspending an upper motor mount frame member, and lower support legs below the lower retainer suspending a lower motor mount frame member, said fixed support frame encased within an enclosure having a vacuum, said enclosure supported by said central support ring;

a central rotational magnetic cylinder forming a non-conductive supporting body and defining an inner cylindrical cavity having an inner surface within which are embedded a plurality of evenly spaced inner magnets having alternately opposing charges, said central rotational magnetic cylinder further defining an upper surface within which are embedded a plurality of evenly spaced upper magnets having alternately opposing charges, a lower surface within which are embedded a plurality of evenly spaced lower magnets having alternately opposing charges, an outer surface within which are embedded a plurality of evenly spaced outer magnets having alternately opposing charges, an upper margin between the upper surface and outer surface having an upper perimeter magnetic ring having a polar charge identical to the polar charge of the inner magnetic flange of the upper retainer creating a repulsed magnetic field between the upper perimeter magnetic ring and the inner magnetic flange of the upper retainer, and a lower margin between the lower surface and the outer surface having a lower perimeter magnetic ring having a polar charge identical to the polar charge of the inner magnetic flange of the lower retainer creating a repulsed magnetic field between the lower perimeter magnetic ring and the inner magnetic flange of the lower retainer, thereby suspending said central rotational magnetic cylinder between said upper retainer and lower retainer by said repulsed magnetic fields without contact;

a central fixed coil suspended within said inner cylindrical cavity by a plurality of anchor bolts, affixing said central fixed coil to said upper motor mount frame member and said lower motor mount frame member, said central fixed coil further having at least four outer coils being wound in alternating and opposite directions from one another, and DC current leads connecting to said central fixed coil, said DC current leads extending from said device; and a plurality of upper stator coils attached to said upper support legs of said fixed support frame and positioned above and proximal to said upper surface of said central rotational magnetic cylinder, a plurality of lower stator coils attached to said lower support legs of said fixed support frame and positioned below and proximal to said lower surface of said central rotational magnetic cylinder and a plurality of intermediate stator coils attached to said central support legs of said fixed support frame and positioned beside and proximal to said outer surface of said central rotational magnetic cylinder, each said plurality of stator coils being even in number and wound opposite from each adjacent stator coil within each said plurality of stator coils each said stator coil attached to an electrical lead extending from said device, wherein each said outer field coil is twice alternately provided the positive and negative charge through said DC current leads during a cycle inducing said central rotational magnetic cylinder to rotate by rotational electro-magnetic induction between said outer field coils and said embedded inner magnets within said cylindrical inner cavity, said upper magnets alternately transferring a polar charge to each proximal upper stator during rotation, said lower magnets alternately transferring a polar charge to each proximal lower stator during rotation, and said outer magnets alternately transferring a polar charge to each proximal outer stator during rotation, producing an alternating current delivered through said enclosure through each said respective electrical lead.

2. The device as disclosed in claim 1 further comprising:

said plurality of upper magnets, plurality of outer magnets and plurality of lower magnets are permanent neodymium magnets, with eight magnets in each said plurality;

said plurality of inner magnets are permanent neodymium magnets, with four magnets is said plurality; and said plurality of upper stator coils, plurality of lower stator coils and plurality of outer stator coils have eight stator coils in each said plurality.

3. The device as disclosed in claim 1, wherein:

each said upper stator coil further comprises a stator ridge, an attaching end attaching to the upper support legs of the fixed frame member, and a lead attaching point, with each upper stator coil insulated from the upper support legs;

each said lower stator coil further comprises a stator ridge, an attaching end attaching to the outer support legs of the fixed frame member, and a lead attaching point, with each lower stator coil insulated from the lower support legs; and each said outer stator coil further comprises a stator ridge, an attaching end attaching to the central support legs of the fixed frame member, and a lead attaching point, with each outer stator coil insulated from the central support legs.

4. The device as disclosed in claim 1, whereby:

said central rotational magnetic cylinder rotates, each of said plurality of upper magnets, each of said plurality of lower magnets and each of said plurality of outer magnets, being alternately charged, induce each respective upper stator coil, lower stator coil and outer stator coil with a magnetic charge, alternating positive and negative, producing an alternating electrical current for each stator coil; and said number of each plurality of upper stator coils, lower stator coils and outer stator coils is equal to the number of respective proximal plurality of upper magnets, lower magnets and outer magnets on each proximal upper, lower and outer surface, so that half of the stator coils in each set are positively charged, while the other half would be negatively charged at any given moment, except for the period in the cycle where the stator coils are all aligned over the non-conductive material of the supporting body, at which moment a neutral charge would be realized by all said upper stator coils, lower stator coils and outer stator coils, said charge directed to each stator coil further transmitted by a respective electrical lead independently attached to a lead attaching point of each said upper stator coil, lower stator coil and outer stator coil.

* * * * *